United States Patent
Olashuk

[19]

[11] Patent Number: 5,830,282
[45] Date of Patent: Nov. 3, 1998

[54] CONTINUOUS PARTICLE SEPARATION OPERATION

[75] Inventor: Kenneth R. Olashuk, Follansbec, W. Va.

[73] Assignee: Weirton Steel Corporation, Weirton, W. Va.

[21] Appl. No.: 794,783

[22] Filed: Feb. 3, 1997

Related U.S. Application Data

[63] Continuation-in-part of Ser. No. 445,530, May 23, 1995, Pat. No. 5,599,395.

[51] Int. Cl.$^6$ ........................................................ C23G 1/36
[52] U.S. Cl. ............................ 134/10; 134/64 R; 134/109; 118/67; 118/68; 118/405; 118/419
[58] Field of Search ...................................... 134/10, 64 R; 266/102, 111–113; 118/58, 67, 68, 405, 419, 610, 623, 683

[56] References Cited

U.S. PATENT DOCUMENTS

| | | | |
|---|---|---|---|
| 3,871,982 | 3/1975 | Idstein | 204/207 |
| 4,119,109 | 10/1978 | Lukac et al. | 134/64 R |
| 4,521,455 | 6/1985 | Domokos | 427/178 |
| 4,784,169 | 11/1988 | Striedieck | 134/111 |
| 5,116,447 | 5/1992 | Kimura et al. | 156/345 |
| 5,179,967 | 1/1993 | Mattiussi | 134/60 |
| 5,348,628 | 9/1994 | Ishibashi et al. | 204/153 |
| 5,352,296 | 10/1994 | Wittel et al. | 134/2 |
| 5,542,983 | 8/1996 | Hamilton et al. | 134/10 |

*Primary Examiner*—Harold Y. Pyon
*Attorney, Agent, or Firm*—Shanley and Baker

[57] ABSTRACT

Continuous removal of particulate surface contaminants, for example, from flat-rolled steel work product, is achieved free of unscheduled interruption by continuing control of surface cleaning liquid characteristics which enables continuing recycling. A major portion of the cleaning liquid of a large capacity tank is continuously circulated between surface treatment of the work product and a continuous in-line type cyclone filtering apparatus, with continuous return of filtrate to surface cleansing. A minor portion (about ten percent) of the cleaning liquid capacity is used to concentrate contaminants by continuously purging the filtering apparatus. Concentrated contaminants are directed to a non-magnetic tank structure with sources of magnetic flux mounted along its external surface such that penetrating magnetic flux acts internally to separate and retain contaminants. Decontaminated liquid is returned for continuing surface cleansing. Separated and retained contaminants are periodically discharged from portions of the separator tank structure so as to maintain purity level of iron-containing particulate, in such returning liquid and in such circulating liquid, at a desired purity level.

13 Claims, 5 Drawing Sheets

CONTINUOUS PARTICLE SEPARATION OPERATION

RELATED APPLICATION

This application is a continuation-in-part of co-owned application Ser. No. 08/445,530, filed May 23, 1995, now U.S. Pat. No. 5,599,395, entitled APPARATUS FOR CONTINUOUS FLAT-ROLLED STEEL STRIP CLEANSING AND FINISHING OPERATIONS.

INTRODUCTION

This invention relates to methods and apparatus enabling continuously-operable surface-processing of iron, steel and other work product of similar characteristics. More particularly, this invention is concerned with controlling characteristics of surface-processing liquid, including a continuing separation, retention and disposal of contaminated solid particulate and associated debris from such liquid, enabling continuing work product processing.

In specific embodiments of the invention, surface-processing liquid is recycled and reused so as to enable continuous processing of work product for extended time periods, free of non-scheduled interruption for purposes relating to characteristics of the processing liquid or such recycled processing liquid being utilized.

Work product refers to iron, steel, silicon steel and alloys of iron with metals, such as nickel or cobalt, which can enhance the ferromagnetic properties of the iron; work product also includes iron oxide and mixtures of iron oxide with metallic oxides, such as zinc and manganese oxides, which can enhance ferromagnetic properties. Such materials which are highly responsive to magnetic flux are referred to as ferromagnetic, as distinguished from materials which are paramagnetic or non-magnetic.

SUMMARY OF THE INVENTION

The invention is concerned with enabling continuous surface processing of steel or other ferromagnetic work product involving removal of surface particulate. During surface processing of flat-rolled low carbon steel, iron fines and associated debris including iron oxides are removed for finish coating; during surface cleansing of silicon steel, such contaminants are removed prior to electrical insulation; and during surface grinding of ferrite components to provide matching surfaces, such contaminants are removed for assembly into electrical transformers.

Important objectives of the invention are to enable continuous-type surface processing of such work product to dislodge ferromagnetic particulate and associated debris, and to achieve continuing control of a surface treatment liquid so as to enable recycled use of such liquid. Continuous-type surface-processing of work product is extended free of unscheduled interruption for purposes relating to processing characteristics of the surface treatment liquid, or such liquid as recycled.

Advantages and contributions are set forth in more detail in describing embodiments of the invention shown in figures of the accompanying drawings.

DETAILED DESCRIPTION OF THE INVENTION

Figure 1:
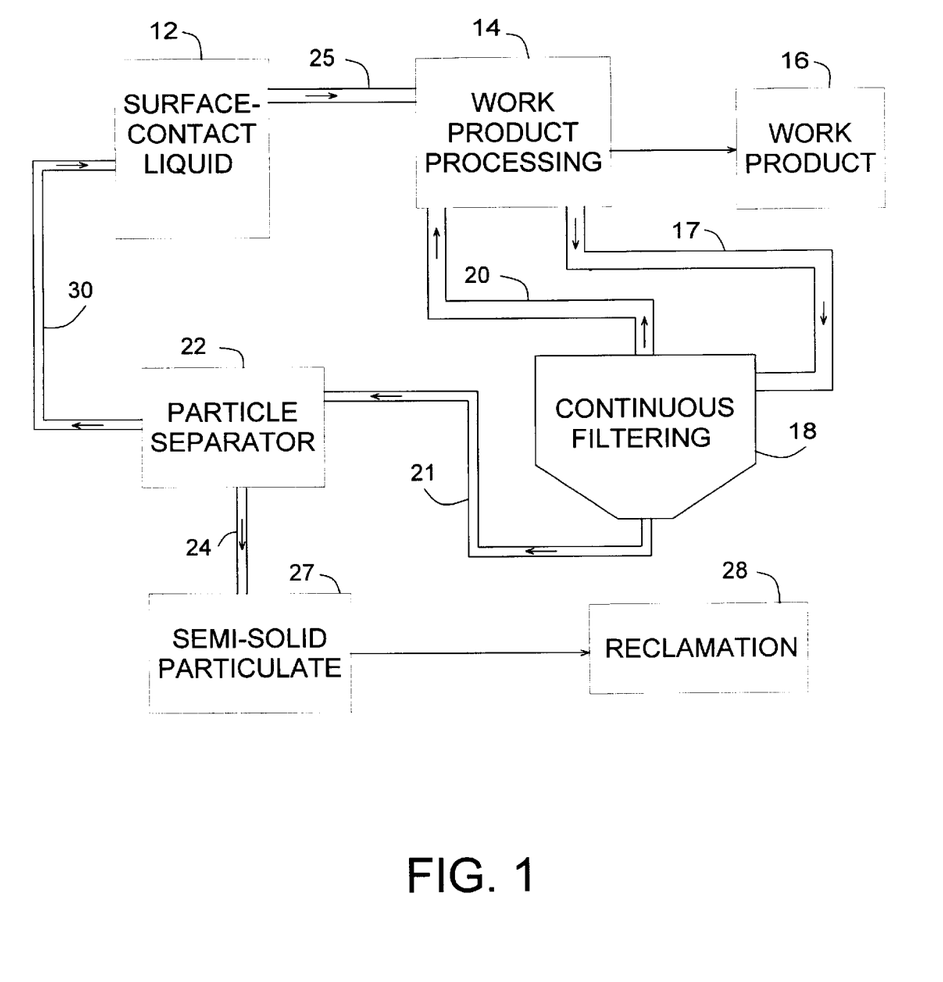
FIG. 1 is a box-diagram general arrangement view for describing methods and apparatus of the invention, and applications of the invention in surface processing of work product.

Embodiments for application of the invention encompassed by the box diagram of FIG. 1 include surface-cleansing treatment to dislodge iron fines and associated debris during processing of steel, and surface preparation which requires removal of ferromagnetic particulate.

Figure 2:
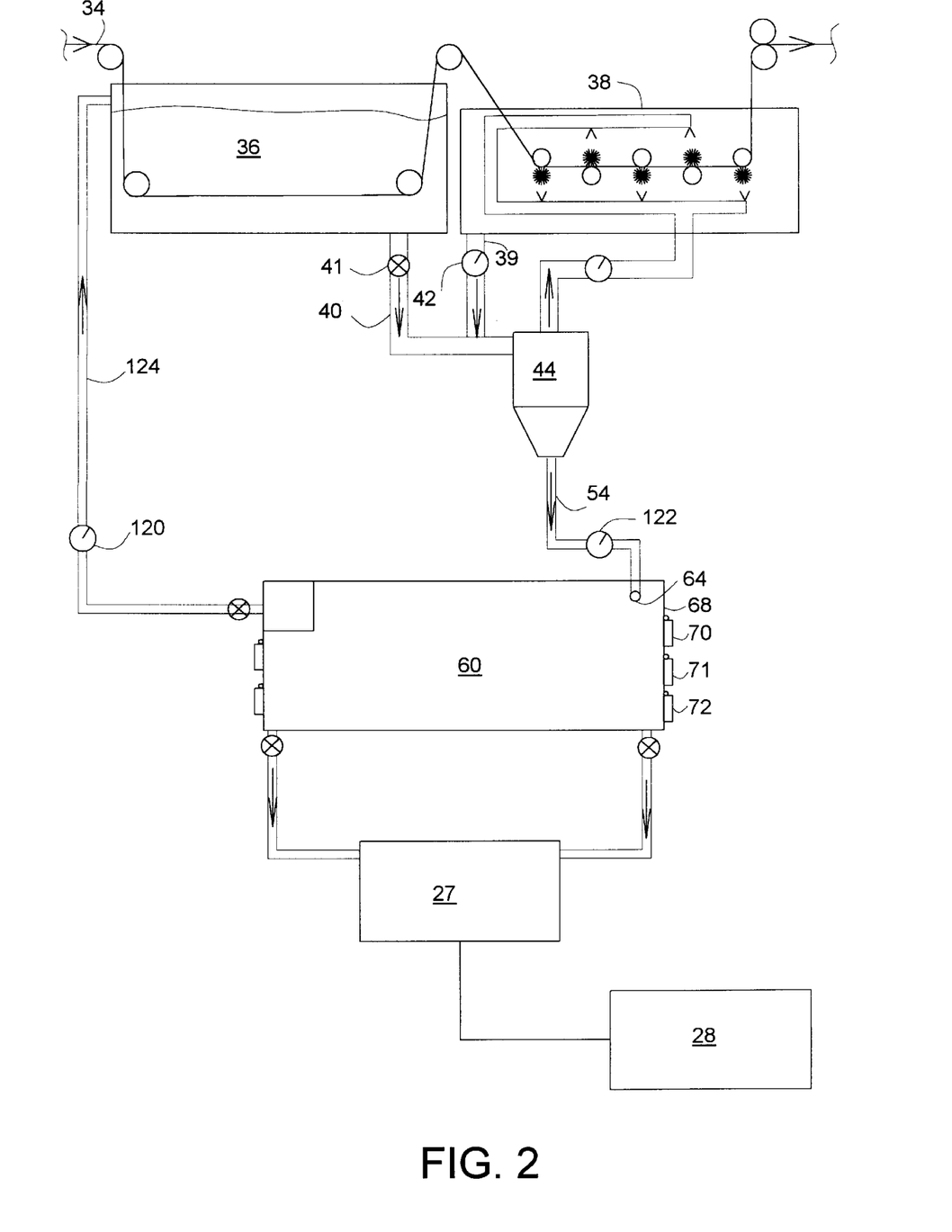
FIG. 2 is a schematic view for describing specific embodiments of the invention for surface processing of continuous-length flat-rolled steel work product.

The embodiments of FIG. 2 relate to removal of surface contaminants from hot rolled steel or cold rolled flat-rolled steel. Large volume cleaning liquid capacities are built into continuous-type operating lines for surface cleansing of steel. The purpose has been to extend production time periods during which a cleaning liquid can be used on the steel free of interruption for purposes of removing all, or large quantities, of contaminated liquid and for substitution of new cleaning liquid.

Unscheduled interruptions for removal of large volumes of contaminated liquid and replacing with new cleaning liquid cause extended down-times of production facilities. Continuous line operations, such as those of continuous-strip hot-dip galvanizing lines, which are designed to be continuous between periodically scheduled temporary interruptions for maintenance, become subject to unscheduled and extended interruptions in order to remove and replace large quantities of surface-processing liquid.

In addition to the time required to remove and replace large volumes of surface processing liquid, disposal on demand of such large volumes of contaminated processing liquid taxes waste disposal abilities of many work product processors, and presents additional environmental concerns.

The present invention enables control of the continuity of such line operations by achieving selective control of surface-processing characteristics of the liquid. The invention extends recycled use of processing liquid by controlled separation, retention and disposal of concentrated contaminants. Multiple coactive steps continuously circulate cleaning liquid from surface treatment of the work product, through continuous filtering apparatus, for return to work product processing.

In FIG. 1, surface-processing liquid is supplied in large volume capacities at tank means 12, which can include a surface treatment as work product is submerged during travel through tank means 12. Also, means for augmenting surface treatment of the work product, by an electrolytic or mechanical scrubbing action, is located in-line at station 14. Work product 16 then travels toward finishing, or to shipment.

Surface-processing liquid, with ferromagnetic particulate and other surface contaminants, is directed from work station 14 (FIG. 1) via conduit 17 to continuous filtering station 18. In the multiple step procedures for control of surface-processing liquid characteristics for recycling, filtering of circulating liquid takes place at station 18, with continuous purging of concentrated contaminants.

While filtrate from continuous filtering apparatus 18 is returned to station 14 through conduit 20, concentrated contaminants are directed with a minor portion of cleaning liquid to particle separator means 22. That combination of the invention eliminates unscheduled dumping of large quantities of contaminated surface-processing liquid into an industrial drainage system. Rather, the invention provides for recycling processing liquid in a manner which can assist industrial facilities to substantially eliminate, or minimize, drainage disposal of waste from operations which previously were subject to disposal of large volumes of contaminated liquid, including unscheduled disposal of such large volumes.

Referring to FIG. 1, concentrated contaminants are directed with such minor portion of the cleaning liquid, through conduit 21 to particle separator 22 in which solid particulate and associated debris are separated, retained and controllably discharged as a semi-liquid sludge through conduit 24. Decontaminated liquid is directed, by conduit 25 to large volume tank means 12; conduit 26 connects tank means to station 14.

Rather than drainage disposal, semi-solid sludge from particle separator means 22 can be prepared at station 27 for reclamation at station 28, in which metal particulate can be reclaimed by driving off liquid and sinter/pelletizing of the metal for introduction into a steel producing furnace. Metallic oxides can be reclaimed thermochemically from discharge of systems for surface grinding of ferrites.

Specific embodiments of the invention are described in relation to FIG. 2; and, more detailed descriptions of the particle separator means and its operation are set forth in relation to FIGS. 3–6.

The surface of flat-rolled steel, after hot rolling and/or cold rolling gauge reductions, is contaminated with mill scale, iron fines and forms of iron oxide. Removal of hot-rolling mill scale, before cold rolling, has generally been lacking or inadequate; possibly, because surface iron fines are also generated during cold rolling gauge reductions. Mill scale surface contaminants in steel mills can also include semi-solid agglomerates when cold rolling lubricants are used, for example, in tandem rolling operations or temper rolling operations.

Five to six thousand gallon tanks of surface cleaning liquid have been provided as part of strip finishing line operations. Continuous filtering of such large capacities has not relieved the previously discussed unscheduled interruptions of operations and the problems associated with dumping of large volumes of contaminated liquids. That is, the level of iron fines in such large capacity tank means continued to increase notwithstanding continuous filtering.

Increasing levels of iron fines in a cleaning liquid are detrimental to uniformity of surface cleansing in a continuous strip finishing line; and, in turn, are detrimental to uniformity of an in-line finish coating bath. For example, increasing levels of iron fines in an in-line cleaning liquid increases the level of iron fines carried by the strip into a subsequent in-line hot-dip galvanizing bath, which decreases efficiency of operation of such bath. Also, an increasing level of iron fines on steel strip in the finishing line increases wear of support roll surfaces during in-line handling prior to coating. The effect on a coating metal bath is described in detail in the above-identified parent application Ser. No. 08/445,530, which is included herein by reference.

Improved methods and apparatus are described in relation to flat-rolled steel continuous-strip cleansing embodiment shown in FIG. 2. Surface contaminated strip 34 is submerged during travel through tank means 36 which contains a large volume (about five thousand gallons) of caustic cleaning solution heated to about one hundred sixty degrees (160° F.) to about one eighty (180° F.). Scrubber 38 is combined to augment surface cleansing. Tank means 36 is located so as to help supply cleaning solution to augmented cleansing station 38.

Cleaning solution, with accompanying contaminants, is withdrawn continuously, during line operations, from a preselected location of such augmented cleansing means 38 and directed through conduit 39. Cleaning liquid is withdrawn from tank means 36, through conduit 40 which includes control valve 41, for a circulation which supplies scrubber 38. Monitoring of the level of iron fines in parts per million (ppm) for control of cleaning liquid can be carried out at locations, such as gage 41 in conduit 40 and gage 42 in conduit 39.

Cleaning solution is continuously circulated between scrubber 38 and in-line type cyclone filtering apparatus 44. Such filtering apparatus is operated to provide for concentrating contaminants by means of a continuous purge of filtered material using a minor portion of the liquid.

The major percentage, about ninety percent, of the cleaning liquid is circulating for the work product cleansing action. After such cyclone centrifugal filtration action in cyclone apparatus 44, the filtrate is returned for continuing the scrubbing action. A minor percentage of the withdrawn cleaning liquid, about ten percent, as utilized in continuous purging of the centrifugally filtered material, is removed from the bottom of in-line cyclone apparatus 44.

In the present invention, drainage disposal of continuously flushed purge is eliminated. Conduit 54 directs flushed purge to particle separator means, shown schematically at 60. Controlling operation of particle separator means 60 (which is described in more detail in relation to FIGS. 3–6) controls decontamination of such minor portion so as to controllably extend operations and avoid such continuing small volume drainage disposal; in addition to avoiding unscheduled disposals of in-line large volumes, as discussed earlier.

Figure 3:
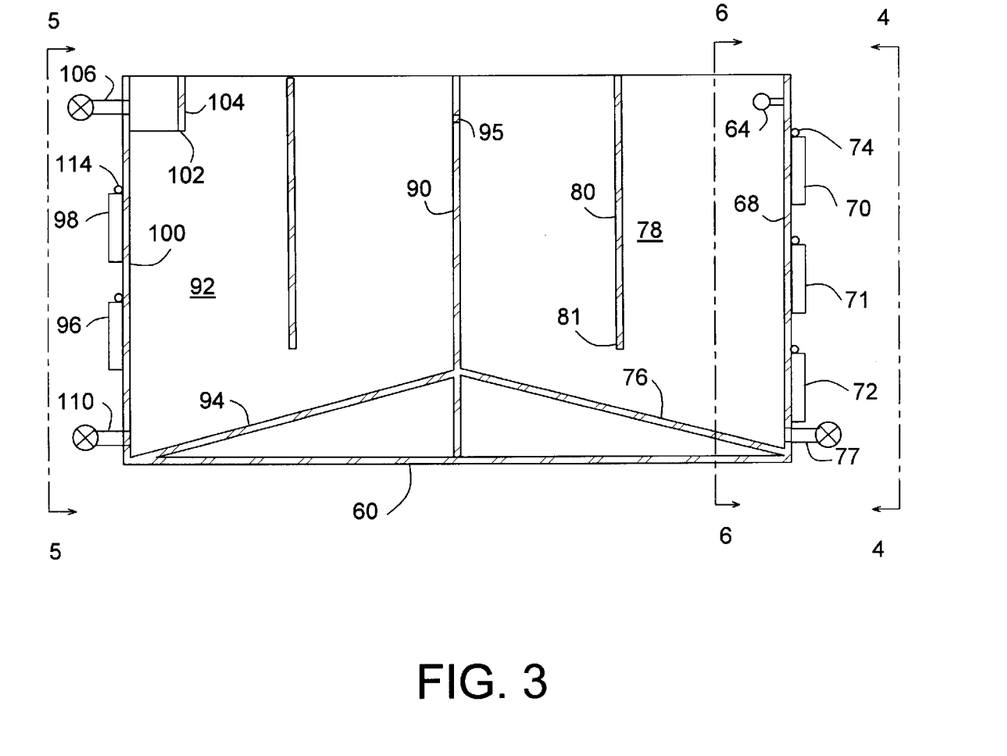
FIG. 3 is a cross-sectional view for describing particulate separator methods and apparatus of the invention.

Referring to FIG. 3, particle separator means 60 is fabricated from paramagnetic (i.e., non-magnetic) material. The use of paramagnetic material, and the configurational aspects of separating means 60 make important contributions. Specifically, the paramagnetic: material and the configuration are chosen to avoid interference with the action of magnetic flux as the contaminated liquid is exposed internally of separator 60; and, also, to avoid interference as decontaminated liquid is accumulated within the compartmented configuration of particle separator 60. Structural framework can be used for bracing bottom and corner borders of polymeric sheet means, provided any metallic structural framework selected is paramagnetic or arranged not to significantly interfere with the action of the lines of magnetic flux.

Referring to the cross-sectional view of particle separator means 60 of FIG. 3, sidewalls, end walls, weirs, a dam site, a froth protector circumscribing an outlet for decontaminated cleaning liquid, and the canted bottom flooring are formed from a paramagnetic material, such as polypropylene; sheet thickness gauge for end walls is about one inch; other portions can be two-inch thickness gauge. An optimum capacity for such particle separator tank means is preselected. A total volume of about one tenth the cleaning system capacity (of about five thousand to six thousand gallons) is preferred. Larger, or multiple, particle separator means are provided for significantly larger reservoir capacities for other steel mill embodiments of the invention, such as in a steel producer's hot mill; or, for embodiments in which special purity levels of iron fines are to be sustained.

Figure 6:
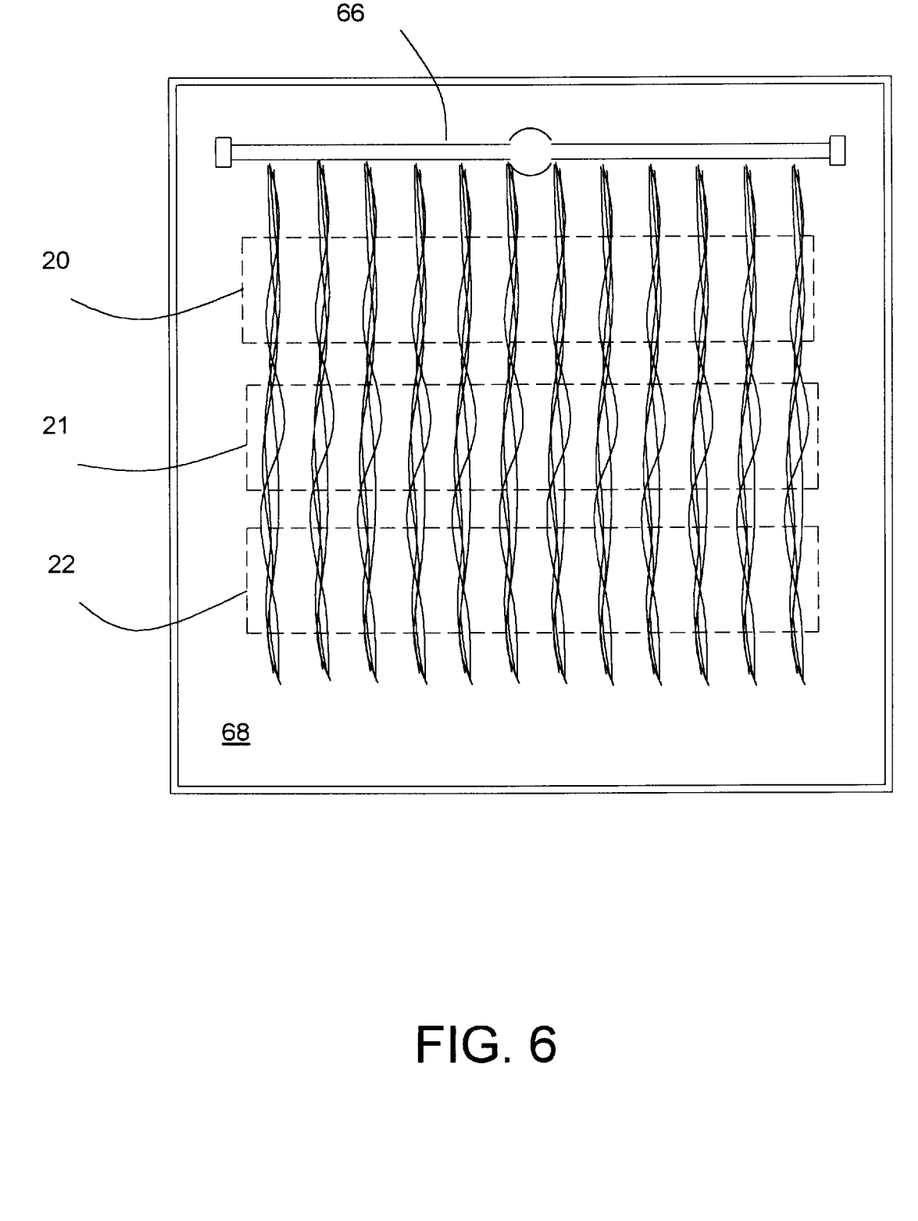
FIG. 6 is an elevational view of an internal wall of the embodiment of FIG. 3, with schematic showing of distribution of contaminated liquid over such a particle separator surface.

Iron fines and associated debris, as concentrated in a minor portion of the cleaning liquid, are directed from filtering structure 44, via conduit 54, as shown in FIG. 2. Such concentrated contaminants are introduced by conduit means 64, at an end wall of separator means 60, and are distributed by conduit means 64 across the width of an inner surface of end receiving wall means 68, as best seen in FIG. 6. Movement of liquid is controlled within separator means 60 to facilitate separation and retention of iron fines and associated debris and to facilitate return of decontaminated liquid of controlled purity level, for iron fines, to the cleansing system.

Magnetic flux source means are mounted on an exterior surface of end wall 68, out of direct contact with such contaminated input cleaning liquid, but with lines of magnetic flux penetrating such end wall 68 so as to act on its opposed (inner) surface, within such tank means of separator 60, on contaminated liquid introduced by conduit 64 (FIGS. 3, 6)

Figure 4:
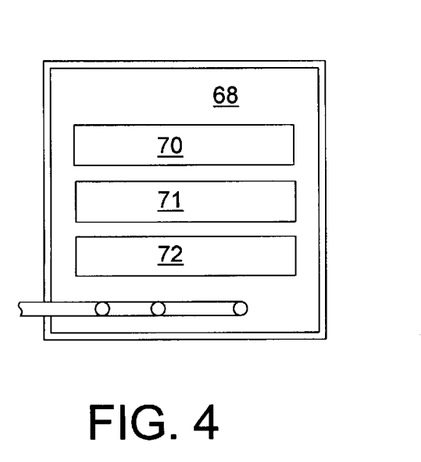
FIG. 4 is an elevational view, taken along the line 4—4 of the particle separator of FIG. 3.

Preferably, magnetic flux source means are mounted along receiving wall 68, in horizontal rows such as 70, 71, 72 (FIGS. 3, 4). A plurality of coacting individual magnets, or a single extended length magnet, can be mounted along each row (FIGS. 3–5) across the width of separator means 60. The establishment and positioning of such sources of magnetic flux, as well as the magnetic force level, are selected. Magnet holding structure, such as that indicated at 74 (FIG. 3), provides for pivotal movement of those sources of magnetic flux for purposes of discharging contaminants, as described later.

Lines of magnetic flux are established in substantially parallel relationship to the internal planar surface of end wall 68; and extend across its width and along its height by preselection of the number of rows, such as 70, 71, 72, and placement along such height. The lines of flux are not affected by the end wall material.

Contaminants in the cleaning liquid, introduced by conduit 64, are attracted by the magnetic force of penetrating lines of magnetic flux acting along such interior surface of end wall 68. Such sources of magnetic flux are in contiguous relationship to such wall. The contaminants are attracted toward such receiving end wall 68 by the magnetic force of magnetic flux penetrating into the tank means. When the thickness of accumulating contaminants increases to where such penetrating magnetic force diminishes, provision is made for discharge of accumulated retained contaminants. Discharge between end wall 68 and canted floor panel 76 (FIG. 3), using liquid drainage, is carried out through valve means 77.

During particle separation, decontaminated liquid rises within compartment 78, which is contiguous to inlet end wall 68. Decontaminated liquid passes under weir 80, at its lower distal end 81, in order to fill compartment 78. Centrally-located dam 90 divides compartment 78 from compartment 91, within the tank structure of separator means 60.

Figure 5:
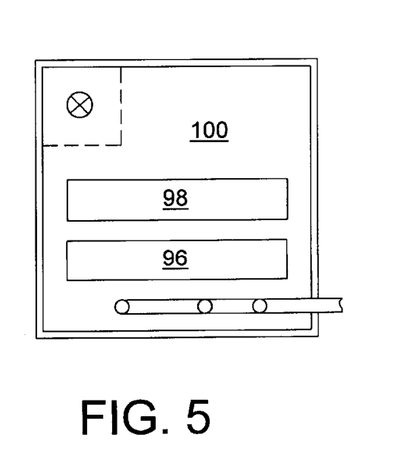
FIG. 5 is an elevational end view taken along the line.

Decontaminated liquid in compartment 78 flows through openings, such as 92, in dam 90. Such liquid, moving along canted floor panel 94, and accumulating in compartment 91, is again brought under the influence of additional sources of magnetic flux, such as those shown in rows 96 and 98 which are located along return end wall 100 (FIGS. 3 and 5). Decontaminated liquid in compartment 91 is returned to surface processing as it accumulates above the lower distal end 102 of froth detainer 104; the latter circumscribes return outlet 106. Return pumping can be provided and valve control provided, as indicated in FIG. 2.

The configurational features of the separator means 60, as depicted and described in relation to FIGS. 3–6, provide extended-surface areas for exposure to the sources of magnetic flux; and, also help to direct liquid movement so as to facilitate controlled separation and retention of iron fines and associated debris. The strength of the sources of magnetic flux, and the rate of movement of contaminated liquid into and through separator 60 are used for efficient control of decontamination and to control the purity level of decontaminated liquid being returned to processing.

Figure 7:
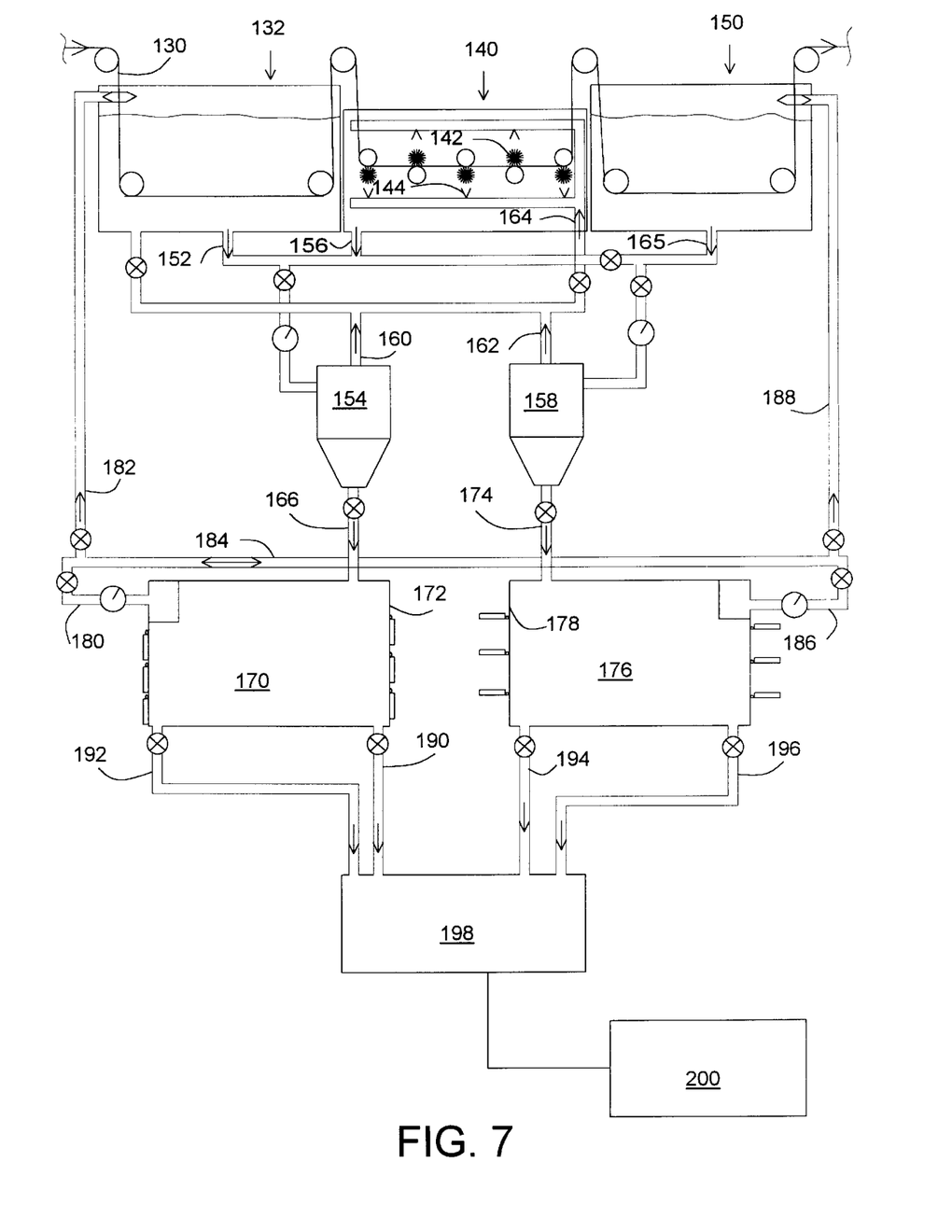
FIG. 7 is a schematic view, partially in cross section, for describing operations for controlling surface-processing liquid, and for describing pivoting magnetic flux sources, in accordance with the invention.

Also, discharge of retained contaminants from compartments 78, 91 through bottom discharge locations 77, 110 (respectively, FIG. 3) is facilitated by rotatably mounting sources of magnetic flux, such that the influence of magnetic flux within the respective compartments of separator means 60 can be readily withdrawn during discharge of a compartment. Pivotally-mounted flat-configuration permanent plate magnets which are rotated into a horizontally-oriented position (as shown in FIG. 7); that is, in perpendicular relationship to the plane of the end wall, discontinue retention of separated contaminants in the respective compartments (78, 91 of FIG. 3).

With removal of magnetic flux action, liquid in compartment 78 (FIG. 3) will readily carry off accumulated contaminants. Also, vacuum means moving along the inner surface of end wall 68 can be utilized. Contaminated sludge of each compartment can be cleared by vacuum suction or drainage methods, or by combinations of those methods. Discharged contaminants can be directed for reclamation as described in relation to FIG. 1.

A time interval for discharge of contaminants from particle separator means 60 at a preselected iron purity level is preferably determined by contaminant measurements at gage 120 (FIG. 2). Comparative measurements at gages 120 and 122 in conduit 54 help to evaluate any decreasing efficiency of contaminant separation in compartment 78; sludge accumulation in compartment 91 also helps to indicate decreasing efficiency and retention in compartment 78. Discharge of contaminant, as discussed above, increases efficiency of the particle separator means. Retained contaminants can be discharged from one (or both compartments 78, 91 simultaneously) of particle separator means 60.

A desired purity level for iron fines is preferably selected for tank 36 (FIG. 2); decontaminated liquid from particle separator 60 is returned, via conduit 124, to such tank. Purity level of decontaminated liquid feedback is measured at gage 120 (FIG. 2) and when decontaminated liquid being returned approaches the selected purity level for tank 36, particle separator means 60 is discharged; that is, purity level of feedback decontamination liquid is kept at a level below the desired purity level for tank 36.

Continuous steel strip in hot-dip galvanizing line can be cleansed satisfactorily, in preheated caustic cleaning liquid, at a purity level below five hundred ppm for iron fines. Rate of contaminant input to the line with incoming flat-rolled steel is a factor in discharge timing of particle separator means 60. Selecting an acceptable operational frequency for discharging contaminants from the particle separator can maintain the level of iron fines in a large capacity (five to six thousand gallons) tank means significantly below such a five hundred ppm level. And, non-scheduled dumping of such large capacity system, as previously required, can be eliminated, or substantially eliminated for practical purposes.

An important contribution of the invention utilizes line interruptions for maintenance. Continuing heating and decontamination of cleaning liquid significantly facilitates sustaining desired purity level in the system since no contaminants are being introduced to the line during scheduled line maintenance intervals Discharge and clearing of an individual interior compartment of particle separator 60, or both interior compartments (78, 92, FIG. 3) simultaneously, can be carried out free of interruption of in-line cleansing or finishing operations because of the short time interval involved in draining and replacing such a minor volume portion as circulation continuous between filtering apparatus of the cleansing system and surface-processing of the work product.

Clearing each compartment separately decreases the volume of incremental discharges which facilitates discharge disposal. Dual contaminant removal systems, as shown in FIG. 7, provide added options under the invention. Two circulating continuous filtering apparatus are combined with two particle separators. The particle separators can be operated in combination with separate control of discharge of each, providing for continuous control of cleaning liquid during discharge of retained contaminants from a single separator means.

Finishing operations for flat-rolled steel encompass hot-dip coating with zinc, zinc alloys, terne metal, and the like; metallic electroplating with tin, zinc, nickel-zinc, chrome and chrome oxide; applying temporary corrosion prevention or passivating coatings, and/or coating with a polymeric material such as dissolved in a solvent or electrolytically applied, or as applied in a solid laminate or powdered form.

In FIG. 7, continuous steel strip 130 travels through tank means 132, as shown, for one stage of surface cleansing in which loose surface particulates are readily removed during such travel; also, any remaining particulates are at least partially prepared for removal in continuous steel strip finishing lines. In the embodiments covered by the schematic of FIG. 7, travel through an initial washing tank means, such as 132, can provide sufficient surface-processing for certain work product lines.

In the embodiment of FIG. 7, strip 130 travels from tank means 132 into augmented surface cleansing tank means, such as scrubber means 140. The strip travels between scrubbing means, such as 142, with cleaning liquid being sprayed under pressure from nozzle means, such as 144. Both surfaces are sprayed and scrubbed in such scrubber means, with flow to and from both such scrubber and such tank means being controlled, as described later.

From scrubber 140, the strip travels to final rinse tank means 150; any remaining loosened surface particulate is rinsed from strip 130 during its travel through rinse tank means 150. Iron fine particle level is preferably sustained at a selected low level in rinse tank means 150.

During full scale operation of processing liquid in the dual contaminant removal system of FIG. 7, cleaning liquid is continuously withdrawn from tank means 132, via conduit 152, and directed to continuous cyclone filtering apparatus 154. And, cleaning liquid is continuously withdrawn from scrubber 140, via conduit 156, and directed to continuous cyclone filtering apparatus 158.

Filtrate from cyclone filtering apparatus 154 is continuously directed through conduit 160 for controlled distribution to tank means 132 and/or to scrubber means 140. Filtrate from filtering apparatus 158 is directed through conduit 162 and controllably directed into scrubber means 140 to scrubber spray system 164 which directs filtrate for spraying each strip surface. The filtrate flowing in scrubber spray system 164 preferably moves in counter flow relationship to the direction of movement of strip 130 through such scrubber 140.

Flow control can be augmented within line pumping means for full-scale line operations, or during scheduled maintenance interruption.

The force of a continuous return of pressurized filtrate from a continuous filtering apparatus is utilized in tank means 132 to dislodge surface contaminants; and is used in scrubber means 140 to facilitate scrubbing and washing away of dislodged particulate.

Removal of processing liquid from rinse tank 150 via conduit 165 is controlled and can be limited to special operating conditions during scheduled maintenance interruptions. In general, limited filtrate from cyclone filtering apparatus 154, 158 need not be returned to tank means 150 except during those special line maintenance interruptions, as described.

Each of the continuous filtering means 154, 158 utilizes a minor portion of the cleaning liquid to continuously purge particulate and associated debris as filtered in each. Such purge liquid with concentrated contaminants is removed from cyclone filtering apparatus 154, by conduit 166, for delivery to particle separator means 170. Such concentrated contaminants are distributed contiguous to entrance end wall 172, in the manner described earlier in relation to FIG. 6.

Purge liquid with concentrated contaminants as removed from cyclone filtering apparatus 158, by conduit 174, is directed to particle separator means 176 contiguous to its entrance end wall 178.

Particle separators 170, 176 have three rows of magnets at each end wall; otherwise, details of each such separator means are as described in relation to FIGS. 3–6. Each provides for return of decontaminated liquid. Conduit means 180 delivers decontaminated liquid from particle separator means 170 to conduit 182 for return to tank means 132; or, for passage through trunk conduit 184 for replenishment of tank means 150.

Decontaminated liquid is removed from particle separator means 176 by conduit means for delivery to tank means 150 by conduit means 186; and can be directed by trunk conduit 184 for replenishment of tank means 132.

Accumulated contaminants, as retained within particle separator means 170, are removed through sludge discharge conduits 190, 192; and discharge sludge conduits 194, 196 remove retained accumulated contaminants from separator means 176, as shown. Sludge can be directed to drainage disposal, or gathered for separation in discharge tank 198, and directed for recycling preparation in reclamation means 200.

The interval for clearing of each separator means can be determined by the level of iron fines selected to be maintained. Preferably, both tank means 132 and 150 are kept below a preselected purity level for iron fines; and decontaminated liquid for both particle separators 170, 176 can be directed to either such tank to decease iron fines to a satisfactory purity level. Clearing both compartments of a four to five hundred gallon particle separator means, provides for satisfactory operations on a hot-dip galvanizing line in which about one point five (1.5) to two point five (2.5) million square feet of strip surface per side/per day of flat-rolled steel are being cleansed. Each particle separator means (170, 176) can be separately operated as the remaining separator means is being discharged and refilled with decontaminated processing liquid. The chemical caustic concentration can be gradually replenished as particle separator means, such as 170, fills after sludge discharge clearing.

For purposes of calculating iron fines in ppm, five-thousand gallons of cleaning liquid are equal to slightly more than six hundred thousand ounces. The present invention can maintain a uniformly low level of iron fines of about thirty ounces of iron fines per tank (132, 150) to about three hundred ounces; that is, a range of about fifty ppm up to a purity level of about five hundred ppm, dependent on frequency of discharging of each particle separator means 170, 176 and contamination input by the steel strip. Such levels can be maintained using magnetizing force magnets of about fourteen hundred gauss, supplied by Eriez, Inc. of Erie, Pa. 16512.

Flat-plate magnets (available from Eriez, Inc.) are preferred in order to provide for planar end wall surfaces for the particle separators. Such planar surfaces facilitate clearing of magnetically-retained contaminants as flat-plate magnets are rotated to a horizontal orientation, as shown in relation to particle separator means 176 in FIG. 7, for discharge of that separator means.

The following tabulated data refer to continuous separation of contaminants utilizing the embodiment, as shown and described in relation to FIG. 7, in a continuous steel strip galvanizing line.

TABLE I

CAPACITIES

| | |
|---|---|
| Tank 132 | 3,000 gals. |
| Tank 150 | 3,000 gals. |
| Continuous Filtering (in-line cyclone type with continuous purge) Apparatus 154, 158: | |
| Tank Withdrawal Rate to each 154, 158 | About 2,700 gal./hr |
| Filtrate from each 154, 158 | About 2,300 gal./hr. |
| Particle Separators 170, 176 | |
| Length | 8 feet |
| Width | 4 feet |
| Height | 4.25 feet |
| Rate of Flushed Purge to Each 170, 176 | About 400 gal./hr. |
| Full-Width Magnet Field Strength | 1400 gauss |
| Entrance End Wall Magnet Rows | 3 |
| Exit End Wall Magnet Rows | 3 |
| Continuous Galvanizing Line throughout (Range) | 1.5 to 2.5 million sq. ft. of surface area per side per day |

In-line continuously-operable centrifugal cyclone filtering apparatus are manufactured by Lakos Separators USA, 1911 North Helm Avenue, Fresno, Calif. 93727, and operated with continuous flushing of filtered material. Caustic detergent materials can be obtained from suppliers such as Elf Atochem North America, Inc., 2375 State Road, Cornwall Heights, Pa. 19020.

While specific dimensions, materials and data have been set forth in describing a specific embodiment of the invention, it should be recognized that in light of the teachings presented, others skilled in the art can devise operations which differ from those specifically described without departing from the inventive concepts described; therefore, in determining the scope of the present invention reference shall be had to the appended claims.

What is claimed is:

1. Method for treating liquid as used in surface processing of work product to enable continuous processing of such product with accompanying recycling of such liquid, comprising A. surface processing of work product providing for removal of iron-containing particulate and associated debris;

B. dislodging such particulate and associated debris from such work product surface by treatment with surface-processing liquid;

C. providing for control of continuity in carrying out such work product processing in which such surface particulate and associated debris are dislodged from such work product surface so as to generate contaminated surface processing liquid;

D. providing for controlled decontamination of such contaminated surface-processing liquid so as to enable recycling of decontaminated processing liquid free of requirement for unscheduled interruption of such work product processing for purposes of maintaining desired surface treating characteristics of such liquid as used for dislodging such particulate and associated debris, by:

(i) supplying a preselected quantity of surface-processing liquid in conjunction with means for initiating such work product processing by dislodging of surface particulate and associated debris so as to produce contaminated processing liquid, (ii) separating such particulate and associated debris from such contaminated surface-processing liquid by providing particulate and associated debris separation means, by:

(a) establishing a non-magnetic polymeric sheet means of predetermined thickness gauge between opposed surfaces, (b) locating magnetic flux source means on one of such opposed surfaces so as to produce lines of magnetic flux which penetrate such predetermined thickness at such location to establish lines of magnetic flux on such remaining opposed surface;

(c) directing such contaminated processing liquid to move over an extended surface area contiguous to such remaining opposed surface, so as to (d) controllably separate, and retain, particulate and associated debris from such contaminated surface-processing liquid by action of such penetrating lines of magnetic flux;

E. returning decontaminated surface-processing liquid, from which dislodged particulate and associated debris have been controllably separated and retained in such particle separation means, for continued use in such work product processing;

F. continuing such separation of such particulate and associated debris from contaminated surface-processing liquid, and G. continuing return of decontaminated liquid to a reservoir means, so as to provide for:

(i) continuing recycling of such decontaminated surface-processing liquid for reuse, so as to (ii) enable continuous surface processing of such work product while avoiding unscheduled interruption of such work product processing for purposes relating to quantitative contamination of such surface-processing liquid above a preselected level.

2. The method of claim 1, in which such work product for surface processing is selected from the group consisting of ferromagnetic metals, namely iron, steel other than stainless steel, alloys of iron providing enhanced ferromagnetic characteristics, and ferromagnetic metallic oxides such as iron oxide and mixtures of iron oxide with metallic oxides providing enhanced ferromagnetic characteristics; and in which work product processing is selected from the group consisting of:
 (a) contacting ferromagnetic metal surfaces with a surface cleaning liquid to dislodge surface particulate,
 (b) contacting continuous length flat-rolled steel surfaces using surface cleaning liquid to dislodge surface particulate,
 (c) the step of (a) or (b) in combination with augmenting surface cleansing by selecting from the group consisting of (i) heating of such liquid, (ii) mechanical/scrubbing action of such surface with such cleaning liquid, (iii) a combination of steps (i) and (ii), and (iv) an electrolytic action in combination with a surface cleaning liquid, and
 (d) shaping, grinding or polishing a ferromagnetic work product by surface abrasion using a surface cleaning liquid to dislodge surface particulate.

3. The method of claim 1, in which the step of supplying of such preselected quantity of surface-processing liquid is carried out by including a large capacity tank means providing processing liquid for participating in dislodging particulate and associated debris, concentrating such dislodged particulate and associated debris, directing such concentrated particulate and associated debris to such particle separation means by utilizing a minor portion of such processing liquid, magnetically separating dislodged particulate and associated debris, controllably retaining separated particulate and associated debris in such particle separator means, and providing for such return of decontaminated processing liquid for participating in such work product processing.

4. The method of claim 3, in which concentrating of such dislodged particulate and associated debris is achieved, by controllably directing surface-processing liquid with dislodged particulate and associated debris into a continuous-action cyclone filtering apparatus, filtering and accumulating particulate and associated debris in such cyclone filtering apparatus, return circulating a major portion of liquid from such cyclone filtering apparatus for participation in such surface-processing of work product;

utilizing a minor portion of such surface processing liquid to continuously flush filtered contaminants from such cyclone filtering apparatus so as to concentrate such contaminants in such minor portion of processing liquid, and continuously directing such minor portion of such surface-processing liquid with such concentrated contaminants to such particle separator means, for decontamination by
 (i) separation and retention of such particulate and associated debris in response to such penetrating magnetic flux, and
 (ii) directing such minor portion of surface-processing liquid, from which dislodged contaminants have been controllably separated and retained by such penetrating line of magnetic flux, for return to participate in such work product processing.

5. The method of claim 2, in which providing for continuing separation and retention of dislodged contaminants, includes:
 providing a holding tank means formed from such nonmagnetic polymeric sheet means,
 disposing such non-magnetic polymeric sheet means to define an entrance end wall of such holding tank means,
 separating and retaining particulate and associated debris by action of such penetrating lines of magnetic flux, within such holding tank means along such entrance end wall,
 accumulating, in such holding tank means, decontaminated surface-processing liquid from which particulate and associated debris have been separated and retained, and
 providing for return of such accumulating decontaminated processing liquid so as to maintain decontaminated work processing liquid, for such work product processing, within a preselected purity range for particulate.

6. The method of claim 5, including accumulating such decontaminated surface-processing liquid for return to work product processing, at a location within such particle separator holding tank means, which is spaced from such inlet-entrance wall means of such separator means.

7. The method of claim 6, including subjecting such accumulating decontaminated liquid to influence of a second set of magnetic flux source means which are spaced from such entrance end wall and which are located contiguous to a return end wall of such holding tank means.

8. The method of claim 5, including selecting extended length steel for surface cleansing, in which such steel is selected from the group consisting of hot-rolled steel and cold-reduced flat-rolled steel, providing means for augmenting surface cleansing in coacting relationship with such large capacity tank means, monitoring ferromagnetic particulate level in parts per million of product processing liquid in such large capacity tank means, and separating and retaining ferromagnetic particulate and associated debris by such penetrating lines of magnetic flux, while returning decontaminated processing liquid from such particle separator means so as to maintain ferromagnetic particulate within a preselected purity level range, in parts per million, in such large capacity tank means.

9. The method of claim 8, including selecting continuous length cold-reduced flat-rolled steel for surface cleansing with heated caustic liquid;

selecting such large capacity tank means to have a capacity of about ten times the capacity of such particle separator holding tank means;

selecting continuous-line steel finishing operations for such work product processing, in which finishing operations are temporarily interrupted for purposes unrelated to such strip surface cleansing; and, during such temporary interruption in finishing operations:
- (a) continuing to heat liquid in such large capacity tank means, and
- (b) continuing circulation of contaminated surface processing liquid from such large capacity tank means to such particle separator means, and
- (c) continuing circulation of decontaminated processing liquid from such particle separator holding tank means to such large capacity tank means, so as to
- (d) decrease particulate level of such heated liquid in such large capacity tank means during such temporary interruption of finishing operations.

10. Particle separator apparatus for separating solid ferromagnetic particulate and associated debris from liquid used in surface-processing of ferromagnetic work product, comprising
- A. non-magnetic polymeric sheet means assembled to present particle separator tank means associated with means for receiving surface-processing liquid contaminated with solid ferromagnetic particulate and associated debris, such receiving means consisting essentially of polymeric sheet means of preselected thickness gauge between opposed surfaces of extended area, with one such surface disposed internally of such tank means and the remaining surface disposed externally of such tank means;
- B. conduit means for delivering such contaminated surface-processing liquid from work product processing for distribution along such internal surface of such receiving means, for separation and retention of contaminating particulate and associated debris within such tank means;
- C. mounting means for securing magnet means contiguous to such external surface of such polymeric sheet receiving means, so as to establish lines of magnetic flux, acting on such opposed internal surface of such receiving means as to separate and retain such solid particulate and associated debris from such contaminated liquid along such internal surface;
- D. such particle separator tank means including a compartment, located in spaced relationship from such polymeric sheet receiving means, for accumulating decontaminated processing liquid and return for recycled work product processing use;
- E. pivotally-operable means associated with such magnet mounting means enabling selective pivotal movement of such magnet means to an orientation, in relation to such polymer sheet receiving means, which substantially prevents lines of magnetic flux from acting to retain such separated particulate and associated debris along such internal opposed surface of such polymeric sheet receiving means, and
- F. drainage means, operable when such magnet means are pivoted to such orientation which prevents such lines of magnetic flux from acting to retain separated contaminants along such internal surface, providing for discharge of such contaminating particulate and associated debris from such particle separator means at a location spaced from such compartment means providing for return of decontaminated processing liquid for recycled use.

11. The apparatus of claim 10, wherein such tank means is defined by polymeric sheet means to have an elongated configuration, with a pair of end walls, one each at a longitudinal end of such elongated tank means, with flat-plate magnet means, secured contiguous to an external surface of each such end wall polymeric sheet means, for subjecting surface-processing liquid to decontaminating separation of solid ferromagnetic particulate and associated debris contiguous to the opposed internal surface of each such end wall, and drainage means associated with each such end wall internal surface, so as to enable independent drainage of retained contamination at each such end wall.

12. The apparatus of claim 10, including a pair of independently operable particle separator tank means, each including
- (i) polymeric sheet receiving means for separating solid ferromagnetic particulate and associated debris, and
- (ii) compartment means for accumulating and returning decontaminated liquid for such recycled use.

13. Apparatus for carrying out the method of claim 1, comprising
- A. large-capacity reservoir means for surface-processing liquid for initiating and sustaining continuous processing of work product,
- B. means for submersing such work product in contact with such surface-processing liquid for dislodging solid ferromagnetic particulate and associated debris from such work product,
- C. means for augmenting liquid contact to dislodge such solid particulate and associated debris, selected from the group consisting of
  - (i) means for heating such surface-contact liquid,
  - (ii) means for physically contacting such work product surface, and
  - (iii) means for electrolytic action on such work product surface;
- D. conduit means for directing work product processing liquid contaminated with dislodged solid ferromagnetic particulate and associated debris to particle separator means, such particle separator means presenting
  - (i) separator tank means with end wall means consisting essentially of polymeric sheet means of predetermined thickness gauge, between opposed internal and external surfaces,
  - (ii) distribution means for directing such contaminated processing liquid in contiguous relationship to such internal surface of such end wall means,
  - (iii) means for mounting magnet means on such external surface of such end wall means, so as to establish lines of magnetic flux acting on contaminated liquid contiguous to such internal surface of such end wall means, so as to
  attract and retain solid ferromagnetic material and associated debris along such internal surface of such end wall means,
  - (iv) compartment means, spaced from such end wall means for retaining such ferromagnetic material and associated debris, for accumulating and returning decontaminated surface-processing liquid to such reservoir means for recycled use, and
  - (v) polymeric sheet weir and wall structure, within such separator tank means, for directing such decontaminated liquid, from which such dislodged solid particulate and associated debris have been separated and retained in such compartment means, for return to such reservoir means.

* * * * *